UNITED STATES PATENT OFFICE.

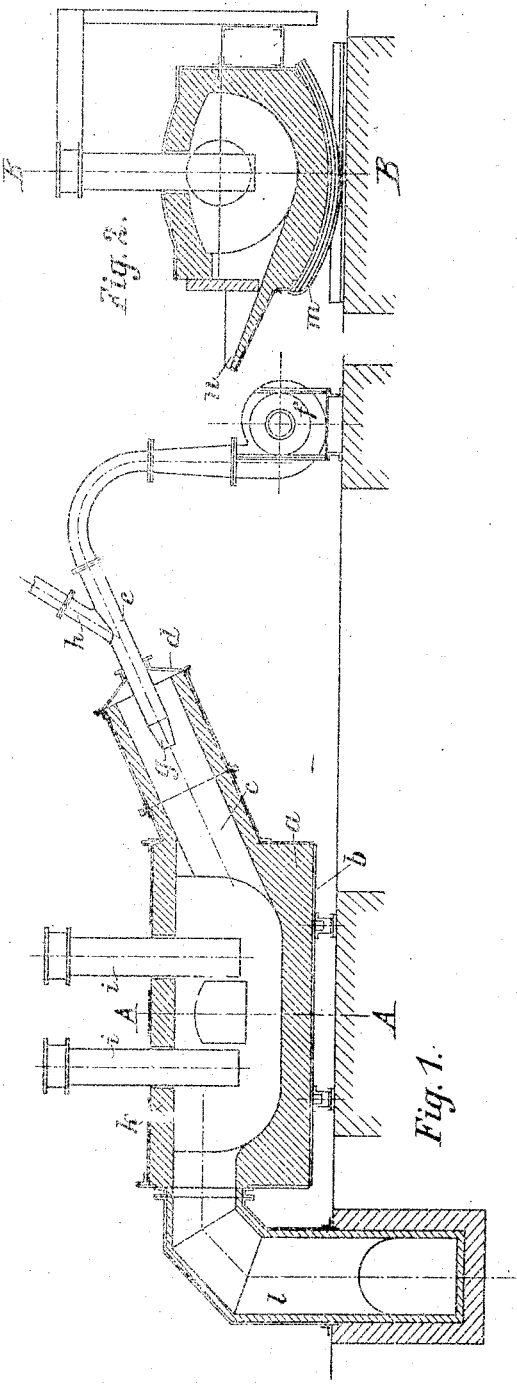

HUBERT HOFF, OF DÜDELINGEN, LUXEMBURG, ASSIGNOR TO EISENHUTTEN-ACTIEN VEREIN DÜDELINGEN, OF DÜDELINGEN, LUXEMBURG.

ELECTRIC FURNACE.

984,371.  Specification of Letters Patent.  Patented Feb. 14, 1911.

Application filed September 25, 1909. Serial No. 519,638.

*To all whom it may concern:*

Be it known that I, HUBERT HOFF, a citizen of the German Empire, and residing at Düdelingen, in the Grand Duchy of Luxemburg, have invented certain new and useful Improvements in Electric Furnaces, of which the following is a specification.

My invention relates to a combined furnace for treating substances with heat especially for chemical and metallurgical purposes, such as the production of glass or the calcination of ores or minerals, or the extraction or refining of metals and the like. The object of my invention is to provide a furnace in which great heat in the cheapest possible manner may be produced, and I effect this by a combination of electric heating with a coal-dust furnace.

The employment on the one hand of the coal-dust furnace alone and on the other hand of the electric heating device for carrying out the processes mentioned above is already known. The electric heating enables any desired high temperatures to be obtained, but electric energy is relatively expensive, so that the employment of electric heating alone is only profitable in connection with a small number of processes. Many attempts have been made to combine electric heating with other methods of heating, for example heating by gas in hearth furnaces, but even in this case a very large expenditure of electric energy is necessary, or other difficulties occur.

When a well arranged system of heating with coal-dust is combined with a system of electric heating an exceedingly high temperature is already obtained by the coal-dust heating, so that it is only necessary for the electric heating to begin in the last stage of the process and the greatest part of the necessary heat is produced by the consumption of coal, that is in an inexpensive way.

I will describe my invention particularly in connection with the production of ingot-iron or steel.

The furnace which I preferably employ is illustrated in the accompanying drawing, in which—

Figure 1 is a longitudinal section through the line B B in Fig. 2, and Fig. 2 a transverse section through the line A A in Fig. 1.

$a$ is the body of a hearth furnace, which is reinforced with steel sheet $b$. On the one side of the furnace an oblique passage $c$ impinges, which is closed by a cover $d$ through which the pipe $e$ of a wind-pressure conduit runs. This conduit is supplied with air under pressure by means of the blower $f$, and terminates in the passage $c$ with a nozzle $g$. Obliquely on the pipe $e$ a second pipe $h$ is arranged, which conveys coal-dust, drawn from any suitable reservoir (not shown in the drawing).

For the electric heating two electrodes $i, i$ are provided, which run through the top $k$ of the furnace into the slag or the bath.

On the side of the furnace situated opposite to the passage $c$, is a flue pipe $l$, which conveys the combustion gases into the chimney.

The burners $e, g$ as well as the electrodes and the flue pipe $l$ can be removed from the sides of the furnace.

The furnace is suitably pivoted on the foundation by means of bent bars $m$ and furnished on the side with a spout $n$, so that it can be tilted by means of a suitable mechanism and be emptied.

The combined electric and coal-dust furnace is used as follows: I put the material to be heated, for example iron scrap and the usual additional substances on the hearth of the furnace. I then set the coal-dust fire in action, regulating the quantities of air and coal-dust by means of suitable devices. The flame produced melts the materials and in consequence of the suitably high temperature they act on one another. When this action has been effected to a sufficient extent, for example when only a small percentage of impurities is still contained in the steel, I stop the coal-dust fire. I remove the coal-dust burner and likewise the flue-pipe $l$ from the furnace and close the openings thereby made by means of doors which are reinforced so as to be fire-proof. I then switch on the current, which I convey by means of the electrodes $i, i$ through the slag floating on the bath. The strength of the current may be automatically and permanently regulated, for example according to the well known Thury system. Any other regulating arrangement may however be employed, for example regulating by hand.

I desire to point out that my invention is not restricted to the combination of a particular coal-dust with a particular electric furnace. Any type of coal-dust or electric furnace may be employed.

My improved furnace is hardly larger than any of the known electric furnaces, and can be made at almost the same price as such. The costs for installing the requisite burner, for introducing the air of combustion into the furnace, as well as those for installing the apparatus for regulating the supply of coal-dust are exceedingly small compared with those incurred for example in connection with a Martin plant and its accessories.

As already mentioned, the improved furnace is suitable for the most varied chemical and metallurgical operations, for which high temperatures are necessary.

Having thus described my invention, what I claim as new and desire to cover by Letters Patent is:—

In an electric furnace the combination of an open hearth, a passage extending at a slant from said hearth, closing means for said passage, a conduit projecting into said passage for conveying air into the furnace, and a pipe for conveying coaldust opening into said conduit.

In witness whereof I have hereunto set my hand in presence of two witnesses.

HUBERT HOFF.

Witnesses:
A. M. STROUPUL,
JESSEREK CEURTLE.